(12) United States Patent
Hong

(10) Patent No.: US 7,665,450 B2
(45) Date of Patent: Feb. 23, 2010

(54) INTERNAL COMBUSTION ENGINE HAVING FUEL MIXING MEANS INSTALLED IN INTAKE PORT

(76) Inventor: Young-Pyo Hong, Suyubyouksan A. P. T 5-1301, 205, Suyu-Dong, Gangbuk-Gu, Seoul 142-771 (KR)

( * ) Notice: Subject to any disclaimer, the term of this patent is extended or adjusted under 35 U.S.C. 154(b) by 552 days.

(21) Appl. No.: 10/598,538

(22) PCT Filed: Mar. 4, 2005

(86) PCT No.: PCT/KR2005/000609

§ 371 (c)(1), (2), (4) Date: Sep. 1, 2006

(87) PCT Pub. No.: WO2005/084145

PCT Pub. Date: Sep. 15, 2005

(65) Prior Publication Data

US 2007/0163555 A1    Jul. 19, 2007

(30) Foreign Application Priority Data

Mar. 8, 2004  (KR)  .................. 10-2004-0015635
Jul. 2, 2004   (KR)  .................. 10-2004-0051615

(51) Int. Cl.
*F02B 31/00* (2006.01)
*F02M 29/02* (2006.01)

(52) U.S. Cl. ...................... 123/592; 123/308
(58) Field of Classification Search .............. 123/306, 123/308, 590, 592
See application file for complete search history.

(56) References Cited

U.S. PATENT DOCUMENTS

| 4,424,777 A | * | 1/1984 | Klomp .................... 123/306 |
| 4,432,312 A | * | 2/1984 | Klomp et al. ............. 123/306 |
| 4,539,954 A | * | 9/1985 | Klomp .................... 123/306 |
| 5,113,838 A |   | 5/1992 | Kim |

FOREIGN PATENT DOCUMENTS

| JP | 58-094828 | 6/1983 |
| KR | 1998-069018 | 12/1998 |
| KR | 20-0263017 | 1/2002 |
| KR | 20-0323440 | 8/2003 |

* cited by examiner

*Primary Examiner*—Noah Kamen
(74) *Attorney, Agent, or Firm*—IPLA P.A.; James E. Bame

(57) ABSTRACT

The present invention relates to an internal combustion engine, and more particularly, to an internal combustion having improved performance by promoting mixing of fuel and air using a fuel mixing means installed at an intake port to improve the flow property of the mixture introduced into a combustion chamber. In an internal combustion engine according to the present invention, a fuel mixing means is installed at an intake port for use in supplying a mixture of fuel and air into a combustion chamber. The fuel mixing means is provided with a stream-disturbing body having a plurality of vanes for disturbing a stream passing through the intake port. The stream-disturbing body is installed rotatably in the intake port to generate a vortex or turbulence so that fuel and air are mixed uniformly and then supplied into the combustion chamber.

16 Claims, 13 Drawing Sheets

INTERNAL COMBUSTION ENGINE HAVING FUEL MIXING MEANS INSTALLED IN INTAKE PORT

TECHNICAL FIELD

The present invention relates to an internal combustion engine, and more particularly, to an internal combustion engine having a fuel mixing means installed in an intake port. The present invention relates to an internal combustion engine in which mixing of fuel and air to be supplied into a combustion chamber is promoted by a fuel mixing means and the flow property of a stream supplied into the combustion chamber is improved, resulting in improved performance.

BACKGROUND ART

FIG. 1 is a sectional view of an intake port formed in a cylinder head of a conventional internal combustion engine.

An intake port 16 is formed in a cylinder head 15 to communicate with a combustion chamber 17 in order to supply a mixture of fuel and air into the combustion chamber. An intake manifold 18 is coupled to an inlet of the intake port 16. Particularly, in case of a gasoline engine, a fuel injector 19 is installed on an intake manifold side at a juncture of the inlet of the intake port 16 and the intake manifold 18. Fuel injected from the fuel injector is mixed with air passing through the intake manifold 18, and the mixture of fuel and air is supplied into the combustion chamber 17. At this time, if a stream of fuel and air is kept in a laminar flow state, the fuel and air are not mixed uniformly, and thus, the occurrence of incomplete combustion and a knocking in the combustion chamber 17 increases. Therefore, in view of improvement in performance of an internal combustion engine, it is an important task to disturb a gas stream to be supplied into the combustion chamber so as to uniformly mix fuel and air with each other.

To this end, there have been developed a variety of conventional swirling units each of which is inserted into an intake manifold or between an intake manifold and an air cleaner to disturb an air stream, thereby inducing the generation of a vortex or turbulence.

However, since such a conventional swirling unit is disposed in an intake manifold or between an intake manifold and an air cleaner, a vortex or turbulence considerably disappears due to friction in a pipe before air that has passed through the swirling unit reaches a fuel injector or a combustion chamber. Accordingly, fuel cannot be efficiently mixed with air, and a mixture of fuel and air supplied to the combustion chamber cannot be formed into a vortex or turbulence thereof within the combustion chamber.

DISCLOSURE OF INVENTION

Technical Problem

An object of the present invention is to provide an internal combustion engine that is provided with a fuel mixing means for disturbing a stream at an intake port of a cylinder head to generate a vortex or turbulence, thereby uniformly mixing fuel and air with each other.

Another object of the present invention is to provide an internal combustion engine, wherein a vortex or turbulence is generated at a location close to a combustion chamber to cause fuel, air, or a mixture of fuel and air to enter the combustion chamber in a vortex or turbulence state, thereby preventing the occurrence of incomplete combustion and a knocking to improve the performance of the engine.

Technical Solution

The present invention provides an internal combustion engine including a cylinder head with an intake port for use in supplying air or a mixture of fuel and air into a combustion chamber, comprising a fuel mixing means that is inserted into the intake port and has a stream-disturbing body with a plurality of vanes formed thereon for disturbing a stream passing through the intake port. The fuel mixing means disturbs a stream in the intake port to generate a vortex or turbulence, thereby promoting mixing of fuel and air.

In the internal combustion engine with the fuel mixing means installed in the intake port according to the present invention, the fuel mixing means may further comprise a hollow cylindrical support ring fixedly inserted into the intake port; a support rib extending radially inwardly from an inner surface of the support ring; a hub having a through-bore and an outer surface fixed to the support rib such that the through-bore is arranged in the same direction as the hollow of the support ring; and a support shaft inserted and supported in the through-bore of the hub. Further, the stream-disturbing body may be supported by the support shaft, and the plurality of vanes may be formed on an outer surface of the stream-disturbing body. At this time, the support ring may include a guide vane extending radially inwardly from the inner surface thereof so as to promote the disturbance of the stream. Moreover, the support shaft is preferably inserted and supported rotatably in the through-bore of the hub to minimize a decrease in intake efficiency by means of the rotation of the stream-disturbing body. It will be readily apparent that the stream-disturbing body may be supported rotatably on the support shaft. To allow the stream-disturbing body to be located at a location possibly closest to the combustion chamber, the internal combustion engine preferably further comprises a hollow cylindrical support ring extension member, which is inserted into the intake port such that a flange formed on one end of the support ring extension member is engaged with an inlet of the intake port, and has the other end coupled to an end of the support ring that is opposite to another end of the support ring adjacent to the combustion chamber. At this time, the support shaft preferably comprises an extension portion having one end fixed to the support rib, and a bent portion that is bent at and extending from the other end of the extension portion and has a diameter less than that of the extension portion, and the stream-disturbing body is rotatably supported by the bent portion.

Preferably, the internal combustion engine with the fuel mixing means installed in the intake port according to the present invention further comprises an auxiliary stream-disturbing body rotatably supported on the support shaft and having a plurality of vanes formed thereon, thereby promoting mixing of fuel and air. At this time, the auxiliary stream-disturbing body preferably takes the shape of a hollow cylinder and has the vanes formed on an inner surface thereof, and an inner diameter of the auxiliary stream-disturbing body including the vanes is larger than an outer diameter of the stream-disturbing body including vanes.

In the internal combustion engine with the fuel mixing means installed in the intake port according to the present invention, each of the vanes of the stream-disturbing body and the auxiliary stream-disturbing body preferably has a spiral shape, and helixes of the vanes of the auxiliary stream-disturbing body and the stream-disturbing body preferably are formed in opposite directions, thereby ensuring efficient mixing of fuel and air.

Further, the internal combustion engine with the fuel mixing means installed in the intake port according to the present invention preferably further comprises a cylindrical outer rim formed to surround radially outward ends of the plurality of vanes of at least one of the stream-disturbing body and the auxiliary stream-disturbing body, thereby reinforcing its strength.

In the internal combustion engine with the fuel mixing means installed in the intake port according to the present invention, the fuel mixing means may further comprise a bearing installed at an inlet of the intake port, the stream-disturbing body may take the shape of a hollow cylinder and has a plurality of vanes formed on an inner surface thereof. The stream-disturbing body may have one end supported rotatably by the bearing and the other end inserted into the intake port. In the internal combustion engine with the fuel mixing means installed in the intake port according to the present invention, the fuel mixing means may further comprise a hollow cylindrical support ring inserted into the intake port such that a flange formed on one end of the support ring is caught at an inlet of the intake port; and a bearing fixed to an inner surface of the support ring. The stream-disturbing body may take the shape of a hollow cylinder, have a plurality of vanes formed on an inner surface thereof, and be supported rotatably by the bearing.

The internal combustion engine with the fuel mixing means installed in the intake port according to the present invention may further comprise a support rib extending radially inwardly from an inner surface of the stream-disturbing body; a hub having a through-bore and an outer surface fixed to the support rib such that the through-bore is arranged in the same direction as the hollow of the stream-disturbing body; a support shaft fixedly inserted into the through-bore of the hub; and an auxiliary stream-disturbing body supported by the support shaft and having a plurality of vanes formed on an outer surface thereof. At this time, the support shaft is preferably inserted and supported rotatably in the through-bore of the hub. It will be readily apparent that the auxiliary stream-disturbing body may be supported rotatably on the support shaft. Preferably, an outer diameter of the auxiliary stream-disturbing body including the vanes is less than an inner diameter of the stream-disturbing body including the vanes.

BEST MODE FOR CARRYING OUT THE INVENTION

Figure 1:
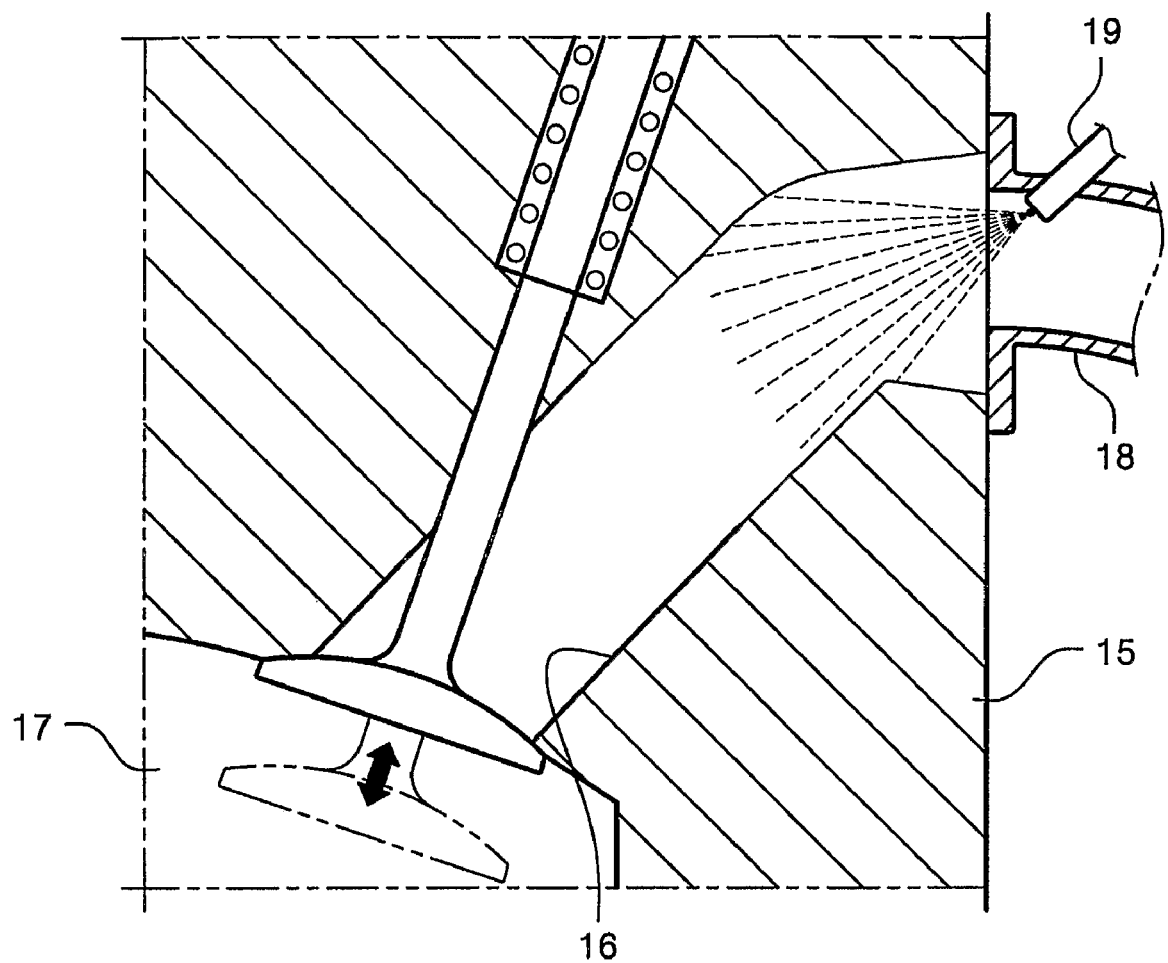
FIG. 1 is a sectional view of an intake port formed in a cylinder head of a conventional internal combustion engine.
Figure 2:
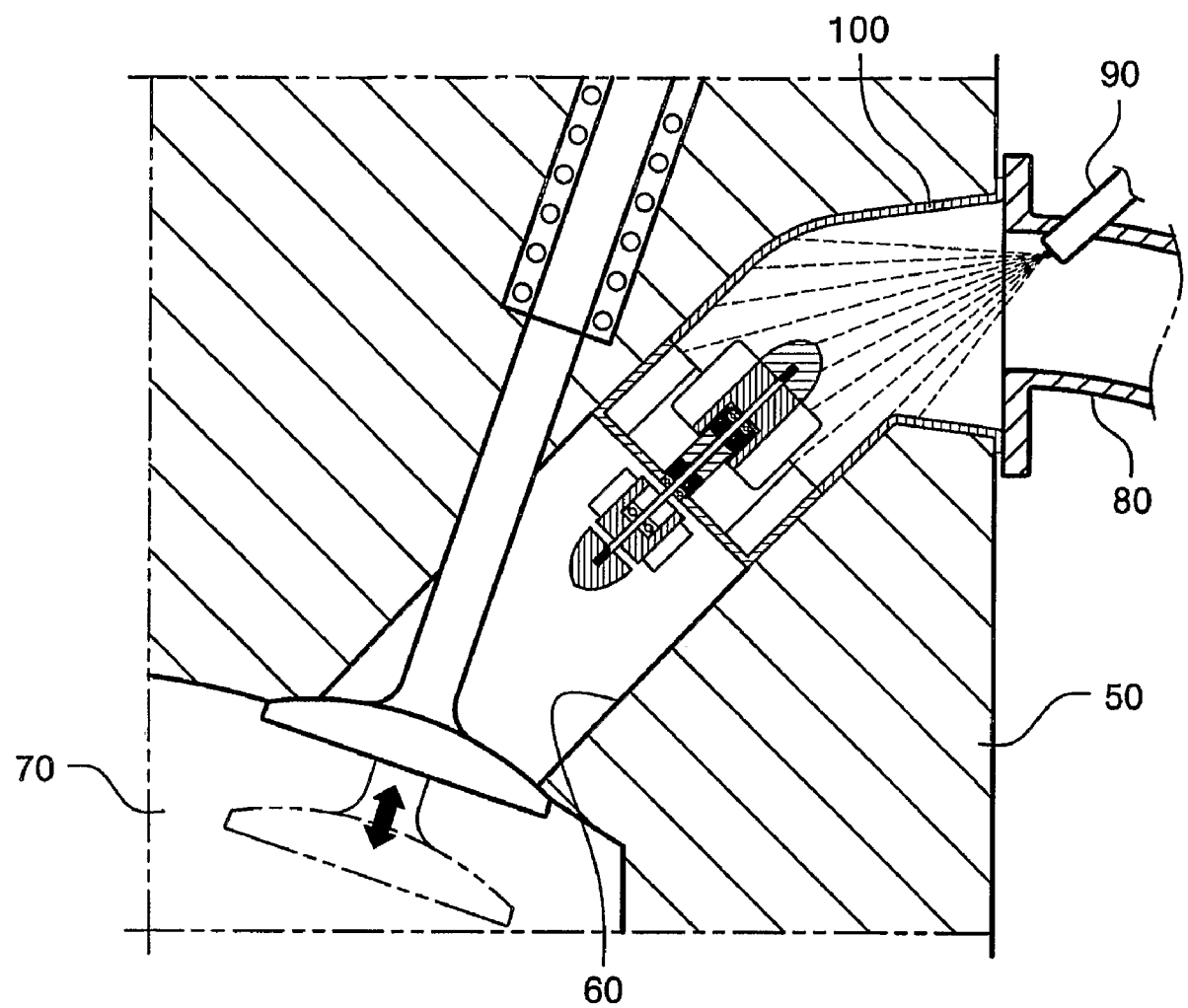
FIG. 2 is a sectional view of an intake port in an internal combustion engine according to a first embodiment of the present invention.
Figure 3:
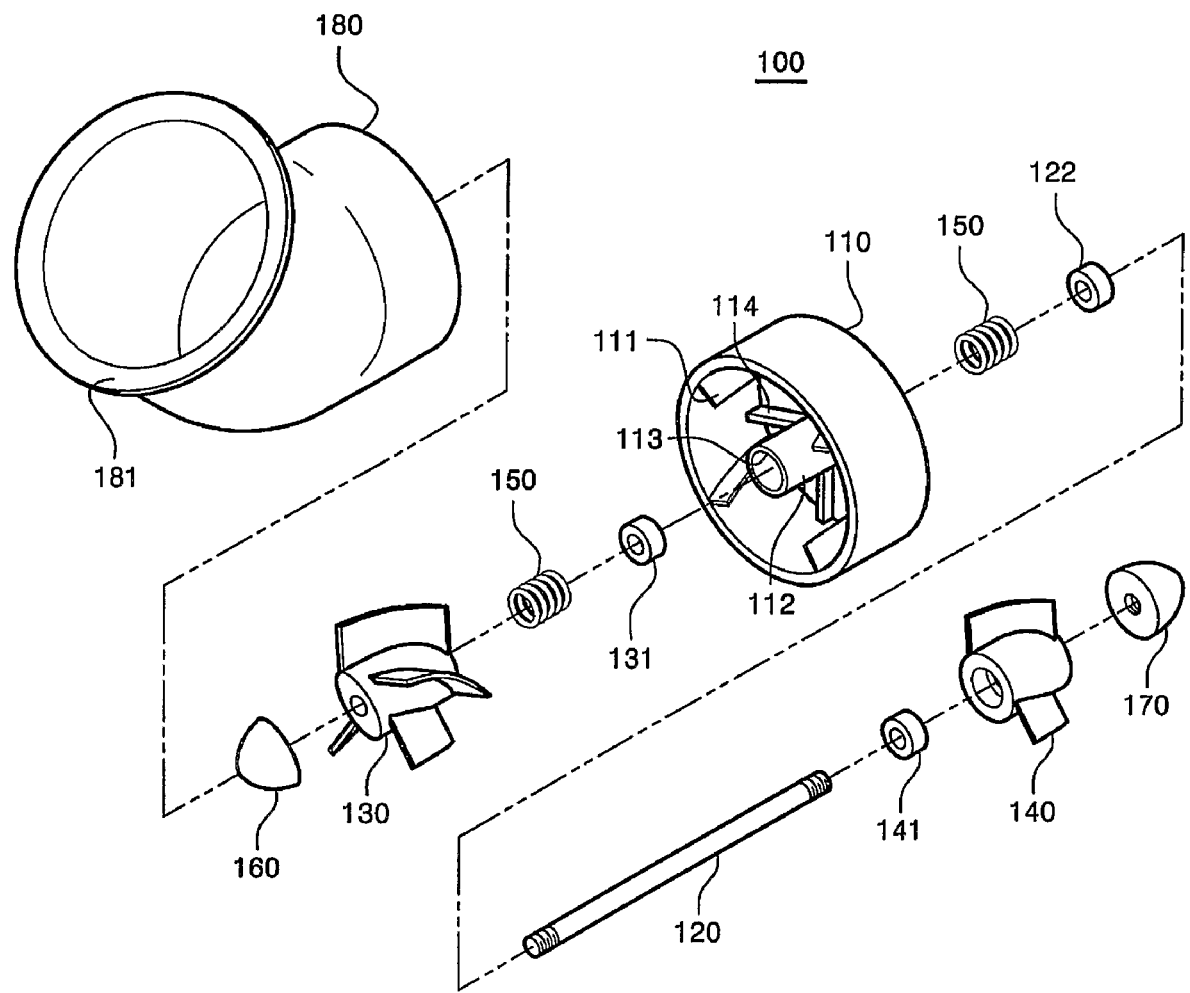
FIG. 3 is an exploded perspective view of a fuel mixing means of the embodiment shown in FIG. 2.
Figure 4:
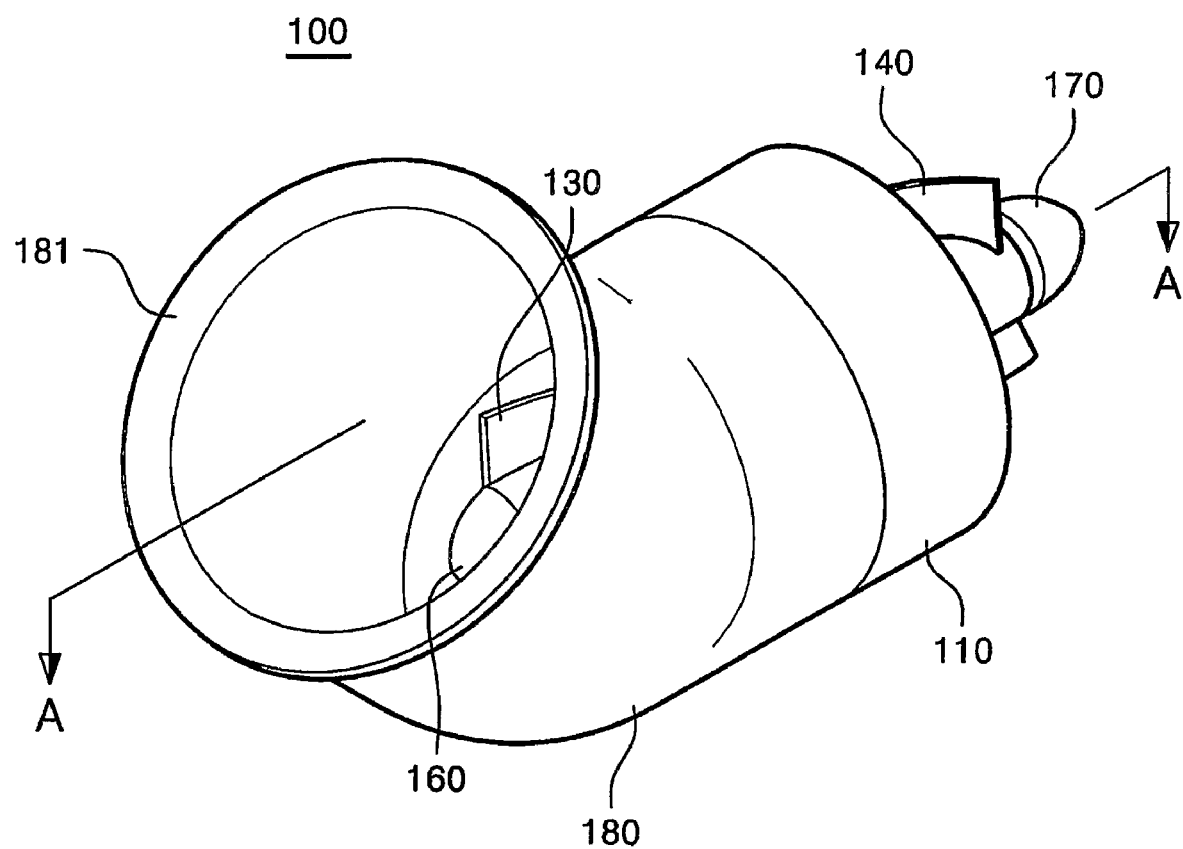
FIG. 4 is a perspective view showing an assembled state of the fuel mixing means of the embodiment shown in FIG. 2.
Figure 5:
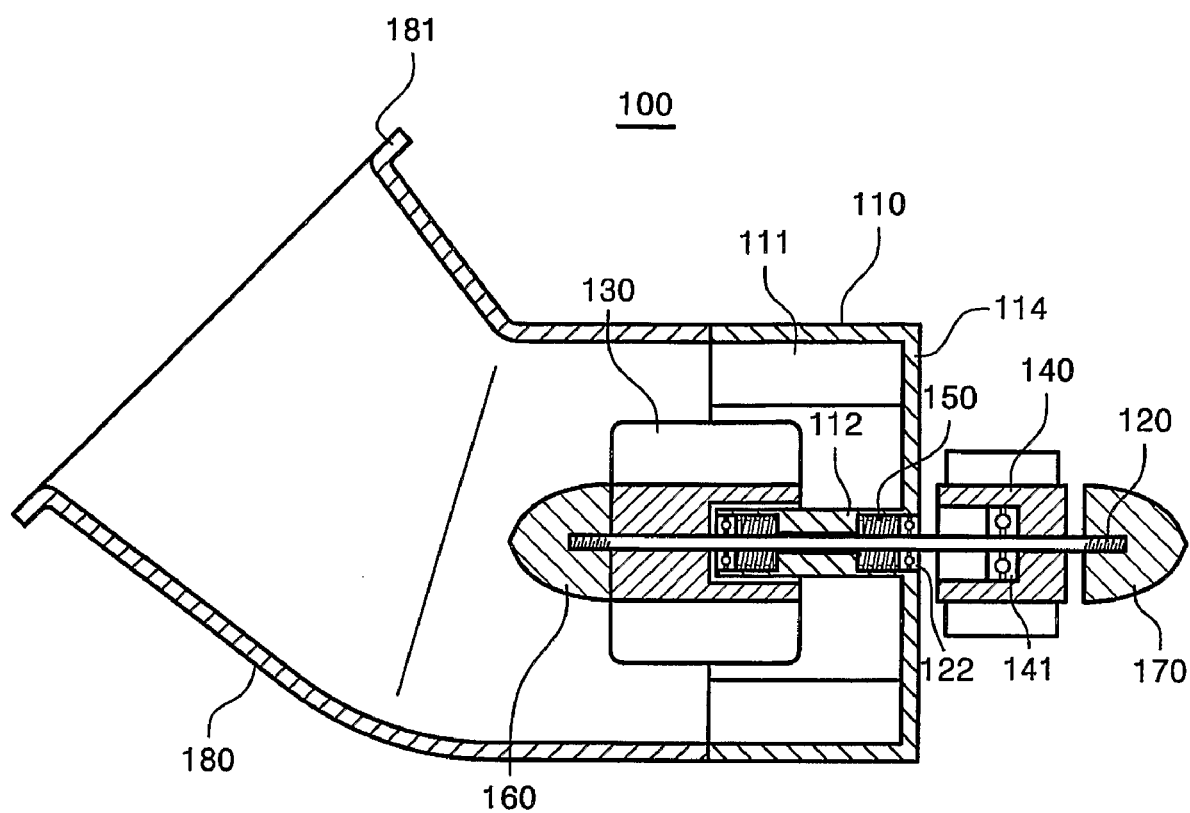
FIG. 5 is a sectional view taken along line A-A in FIG. 4.

FIG. 2 is a sectional view of an intake port in an internal combustion engine according to a first embodiment of the present invention, FIG. 3 is an exploded perspective view of a fuel mixing means of the embodiment shown in FIG. 2, FIG. 4 is a perspective view showing an assembled state of the fuel mixing means of the embodiment shown in FIG. 2, and FIG. 5 is a sectional view taken along line A-A in FIG. 4.

The internal combustion engine of this embodiment includes a fuel mixing means 100 fixedly inserted into an intake port 60 that is formed in a cylinder head 50 and functions as a passage through which a mixture of fuel and air is supplied into a combustion chamber 70.

The fuel mixing means 100 comprises a hollow cylindrical support ring 110 that is inserted into the intake port 60. Since a conventional cylinder head is manufactured by means of casting, it is difficult to cut the intake port or change the shape of the intake port. Considering this fact, the fuel fixing means is separately manufactured and the support ring 110 is used to insert and fix the fuel mixing means in the intake port. In order to improve a fuel mixing efficiency, it is preferred that a plurality of guide vanes 111 be formed radially inwardly on an inner surface of the support ring 110. It is also preferred that the support ring 110 comprise a support ring extension member 180 so that a stream disturbing body 130 of this embodiment can be located at a position closest to the combustion chamber 70 from an inlet of the intake port 60. For the purpose of easiness of manufacture of the support ring extension member 180, it is preferred that the support ring extension member 180 take the shape of a hollow cylinder and has a flange 181 formed at one end thereof to be caught at the inlet of the intake port, the longitudinal shape of the support ring extension member be matched with a curved shape of the intake port 60, and the support ring extension member be manufactured separately from and the support ring 110 and then welded to the support ring.

A plurality of support ribs 114 extend radially inwardly from the inner surface of the support ring 110. Each of the support ribs 114 should have a small surface perpendicular to a flowing direction of the mixture of fuel and air, such that the support ribs do not obstruct the flow of the mixture passing through the hollow of the support ring. A hub 112 is disposed in the hollow of the support ring 110 and secured by the support ribs 114. The hub 112 has a through-bore 113 formed therein in the same direction as the hollow of the support ring.

A support shaft 120 is inserted into the through-bore 113 of the hub 112 such that both ends of the support shaft are exposed to the outside. One end of the support shaft 120 is inserted into the stream-disturbing body 130 and the other is inserted into an auxiliary stream-disturbing body 140. Both the stream-disturbing body 130 and the auxiliary stream-disturbing body 140 have a plurality of spiral vanes formed on outer surfaces thereof, respectively. Although a vortex or turbulence can be generated by providing only the stream-disturbing body 130, it is preferred that, in order to generate a stronger vortex or turbulence, the vanes of the auxiliary stream-disturbing body 140 be formed to have helixes in a direction opposite to those of the vanes of the stream-disturbing body 130 so that the auxiliary stream-disturbing body can rotate in a reverse direction with respect to the stream-disturbing body.

It is sufficient so far as the stream-disturbing body 130 can rotate with respect to the hub 112. Therefore, it is possible to implement both a configuration in which the support shaft 120 is rotatably supported by the hub 112 and the stream-disturbing body 130 is fixed to the support shaft 120, and a configuration in which the support shaft 120 is fixed to the hub 112 and the stream-disturbing body 130 is supported to rotate with respect to the support shaft 120. In the fuel mixing means of this embodiment, the stream-disturbing body 130 is fixed to the support shaft 120 and the support shaft 120 is rotatably supported by the hub 112. Preferably, bearings 122 and 131 are interposed between the hub 112 and the support shaft 120 to reduce rotational friction, and springs 150 are inserted to prevent axial vibration and to ensure a certain degree of play. Meanwhile, since the auxiliary stream-disturbing body 140 should be able to rotate in the reverse direction with respect to the stream-disturbing body 130, it is preferred that the auxiliary stream-disturbing body be supported to rotate with respect to the support shaft 120 in both the aforementioned configurations. Even in these cases, there is a need for reducing rotational friction by interposing a bearing 141 between the auxiliary stream-disturbing body 140 and the support shaft 120.

Preferably, in order to prevent the stream-disturbing body 130 and the auxiliary stream-disturbing body 140 from escaping in an axial direction of the support shaft 120, caps 160 and 170 are coupled to both the ends of the support shaft 120, respectively. Further, the caps 160 and 170 preferably take the shape of a streamline to maintain an unhindered flow of the mixture.

Meanwhile, although the fuel mixing means 100 of this embodiment has the stream-disturbing body and the auxiliary stream-disturbing body disposed on both sides of the hub 112, both the stream-disturbing body and the auxiliary stream-disturbing body may be located on one side of the hub 112.

When the mixture of air, which has passed through an intake manifold 80, and fuel, which has been injected from a fuel injector 90, passes through the fuel mixing means 100 of this embodiment constructed as above, a stream of the mixture rotates the stream-disturbing body 130 and is primarily developed into a vortex or turbulence, and the stream of the mixture then rotates the auxiliary stream-disturbing body 140 in the reverse direction with respect to the stream-disturbing body 130 and is secondarily developed into a vortex or turbulence. During this process, the generation of the vortex or turbulence is more intensified by the guide vanes 111 of the support ring 110 so that uniform mixing of the fuel and the air can be induced. Therefore, it is preferred that each of the guide vanes 111 of the support ring 110 have a spiral shape in the same manner as the vanes of the stream-disturbing body and the auxiliary stream-disturbing body. Further, since the vortex or turbulence is generated at a position in the intake port, which is close to the combustion chamber, the mixture supplied into the combustion chamber is in the vortex or turbulence state. Accordingly, it is possible to prevent incomplete combustion in the combustion chamber.

Figure 6:
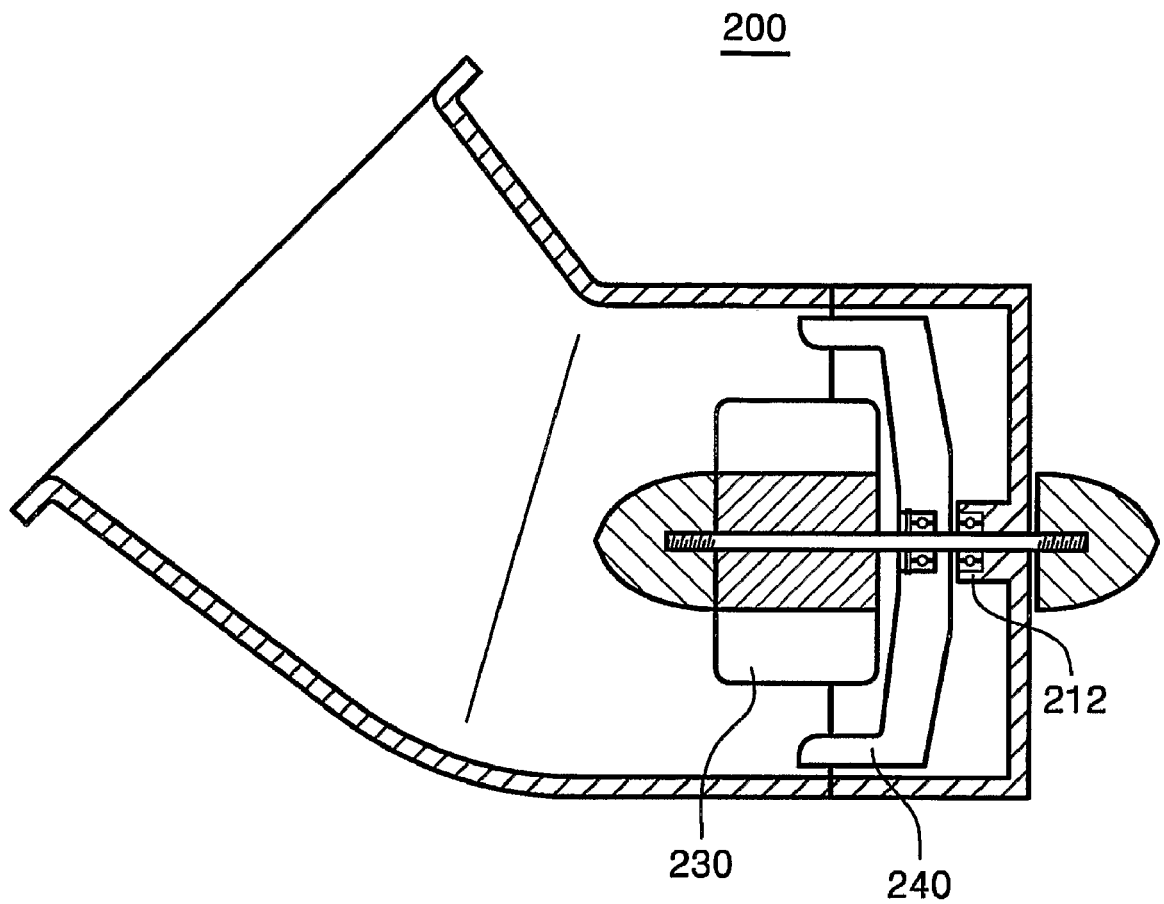
FIG. 6 is a sectional view of a fuel mixing means of an internal combustion engine according to a second embodiment of the present invention.

FIG. 6 is a sectional view of a fuel mixing means of an internal combustion engine according to a second embodiment of the present invention.

Since this embodiment has a structure similar to that of the first embodiment described above, only the difference between the two embodiments will be described below. In a fuel mixing means 200 of this embodiment, a stream-disturbing body 230 and an auxiliary stream-disturbing body 240 are serially arranged on the same side of a hub 212. Further, the auxiliary stream-disturbing body 240 takes the shape of a hollow cylinder and has a plurality of vanes formed on an inner surface thereof. It is preferred that the inner diameter of the auxiliary stream-disturbing body 240 including the vanes, i.e., the distance between inner ends of two facing vanes (ends thereof closer to the center of the hollow), be larger than the outer diameter of the stream-disturbing body 230 including vanes. Therefore, the stream-disturbing body 230 can be disposed partially and fully within an inner space defined by the auxiliary stream-disturbing body 240. In this case, since the vanes of the stream-disturbing body 230 and the vanes of the auxiliary stream-disturbing body 240 can be located on an identical plane perpendicular to a flowing direction of the mixture, the mixture passing through the plane can be formed into a stronger vortex or turbulence.

Figure 7:
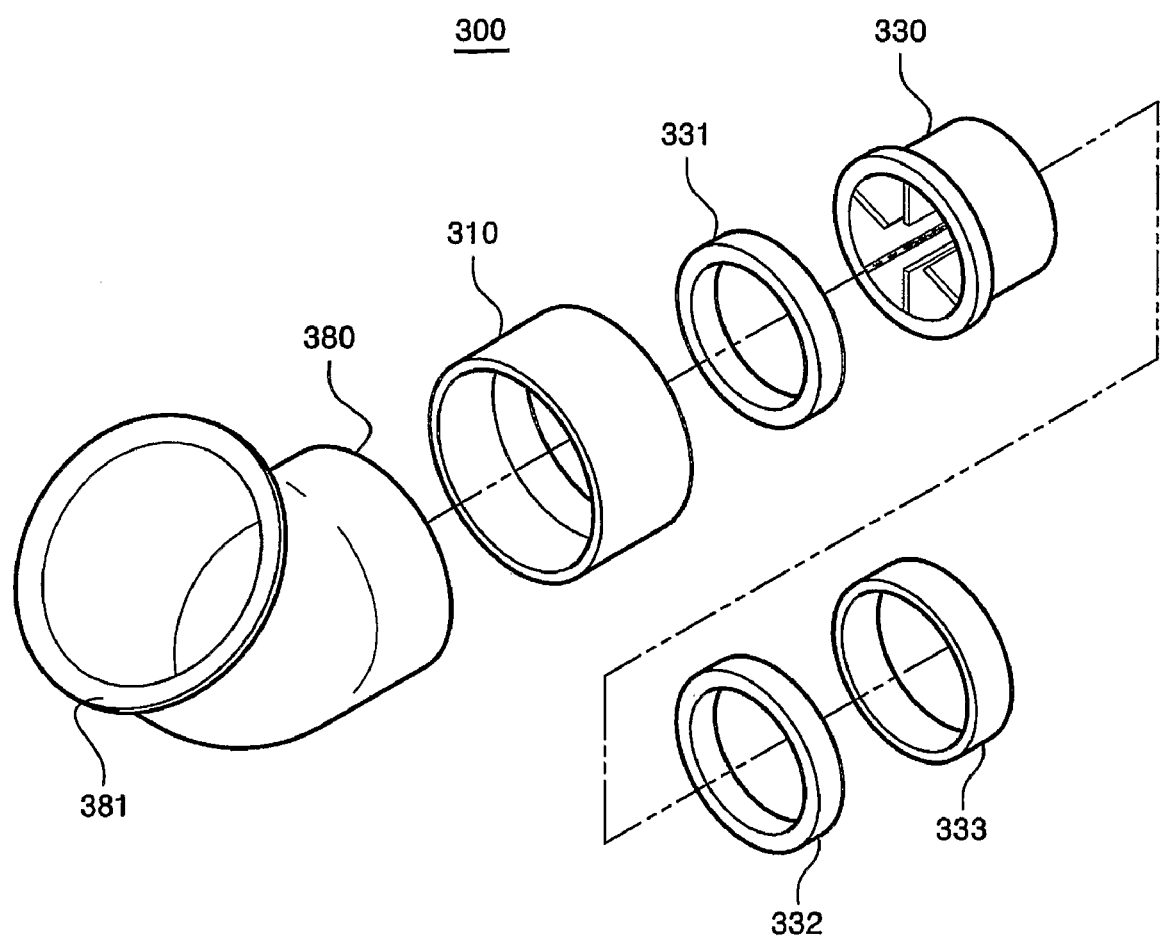
FIG. 7 is an exploded perspective view of a fuel mixing means of an internal combustion engine according to a third embodiment of the present invention.
Figure 8:
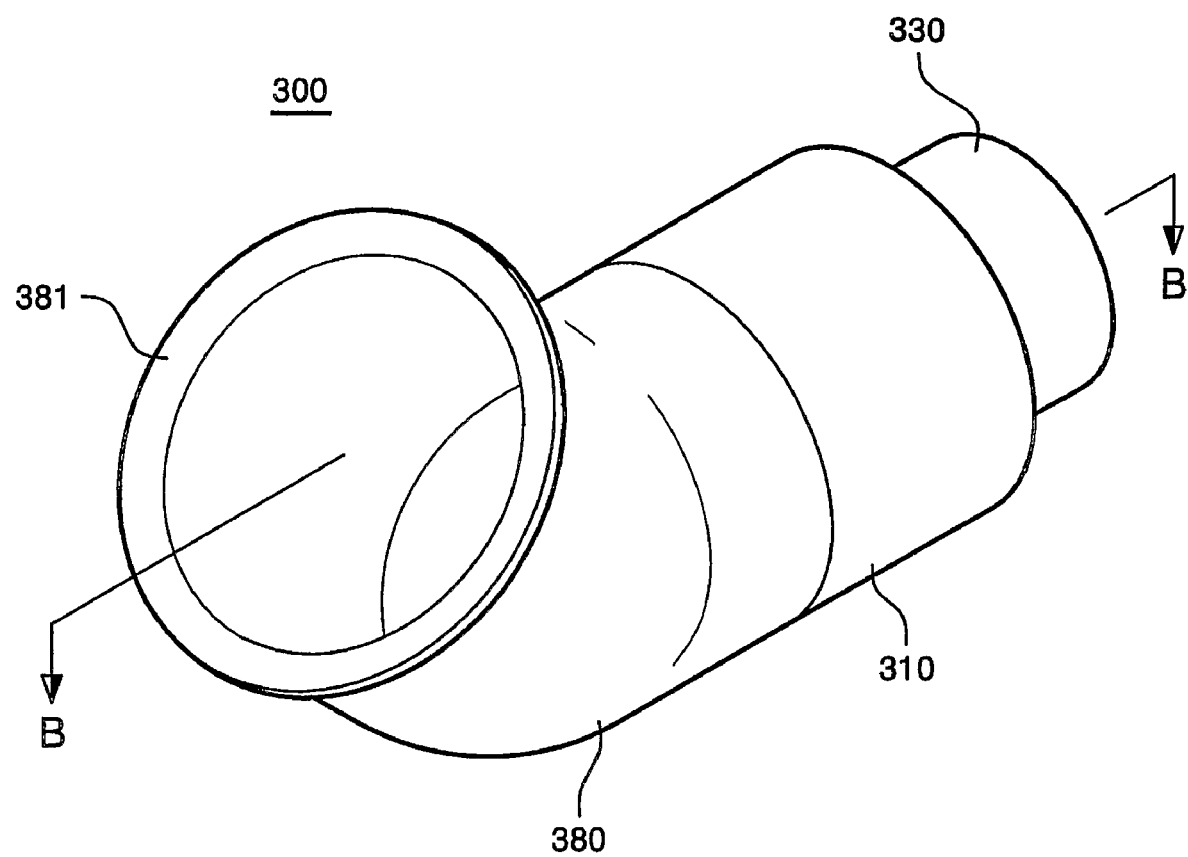
FIG. 8 is a perspective view showing an assembled state of the fuel mixing means of the embodiment shown in FIG. 7.
Figure 9:
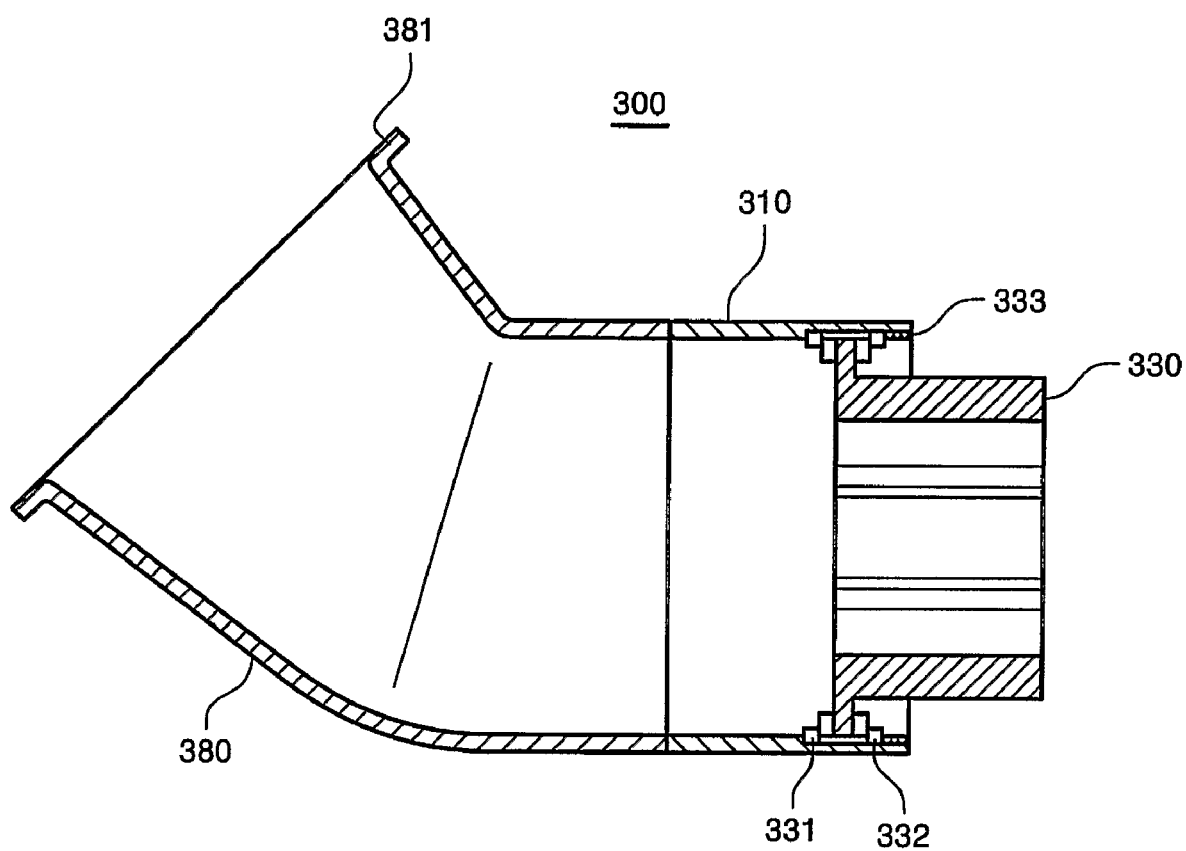
FIG. 9 is a sectional view taken along line B-B in FIG. 8.

FIG. 7 is an exploded perspective view of a fuel mixing means of an internal combustion engine according to a third embodiment of the present invention, FIG. 8 is a perspective view showing an assembled state of the fuel mixing means of the embodiment shown in FIG. 7, and FIG. 9 is a sectional view taken along line B-B in FIG. 8.

A fuel mixing means 300 of this embodiment comprises a hollow cylindrical support ring 310.

A stream-disturbing body 330 is received and rotatably supported within the hollow of the support ring 310. The stream-disturbing body 330 takes the shape of a hollow cylinder and has vanes extending radially inwardly from an inner surface thereof. In order to reduce rotational friction, bearings 331 and 332 are preferably interposed between the stream-disturbing body and the support ring. More preferably, thrust bearings are interposed therebetween in order to enlarge a sectional area through which a mixture of fuel and air passes. Moreover, a fixing ring 333 is inserted so that the interposed bearings 331 and 332 can be fixed to the support ring 310.

It is preferred that the support ring 310 include a support ring extension member 380 so that the fuel mixing means 300 of this embodiment can be located at a position in an intake port, which is possibly closest to a combustion chamber. The support ring extension member 380 has a flange 381 formed at an end thereof. It will be readily apparent that the longitudinal shape of the support ring extension member should be matched with that of the intake port in the same manner as the first embodiment described above.

On the other hand, in a case where the fuel mixing means 300 of this embodiment is installed at an inlet of the intake port, there is no need for the support ring extension member 380 as well as the support ring 310. In this case, a thrust bearing is preferably installed directly in the inlet of the intake port and the stream-disturbing body is rotatably supported by the thrust bearing.

When the mixture of fuel and air passes through the fuel mixing means of this embodiment constructed as above, a stream of the mixture rotates the stream-disturbing body 330 and is developed into a vortex or turbulence. Therefore, uniform mixing of the fuel and the air can be obtained. Further, since the vortex or turbulence is generated at a position in the intake port, which is close to the combustion chamber, the mixture supplied into the combustion chamber is in the vortex or turbulence state. Accordingly, it is possible to prevent incomplete combustion in the combustion chamber. Moreover, with the use of the thrust bearing, an area through which the mixture passes can be maximally secured. In addition, since vibration caused by the rotation of the stream-disturbing body 330 having this structure is less than that caused by the stream-disturbing bodies of the aforementioned embodiments, it is possible to improve durability and to secure stable performance.

Figure 10:
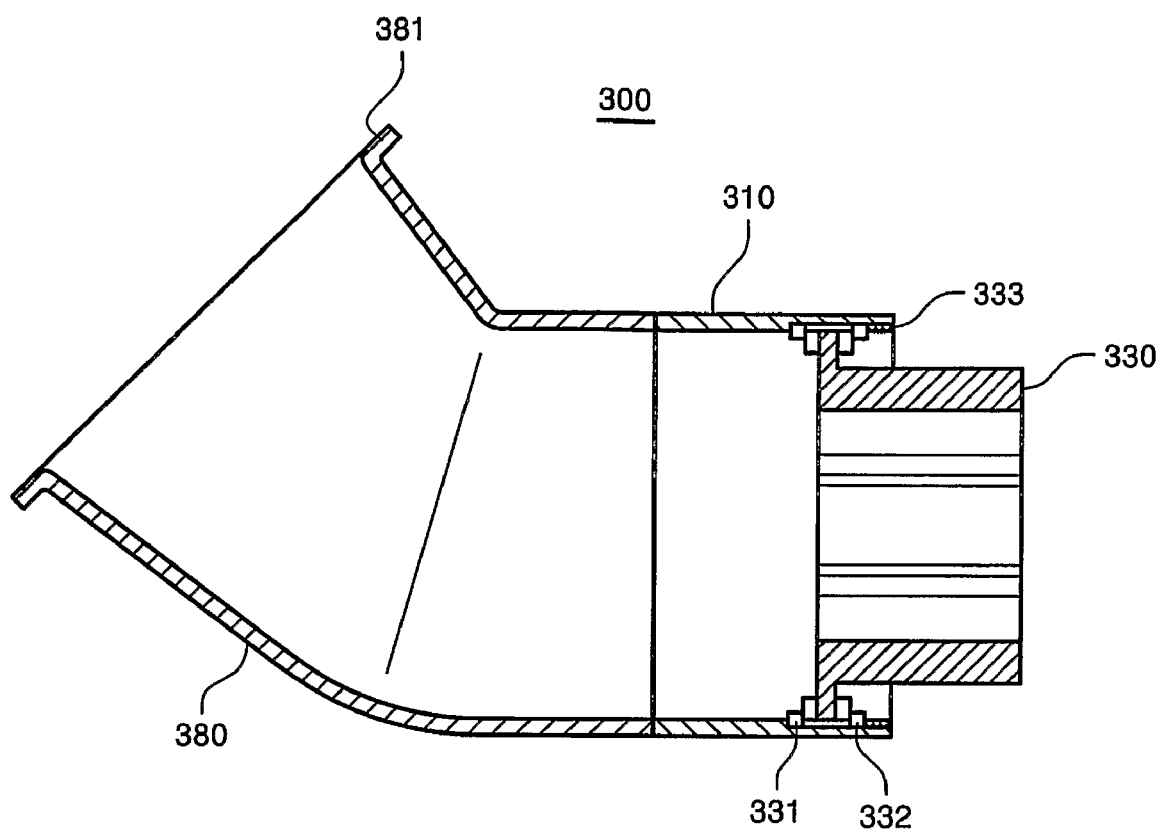
FIG. 10 is a sectional view of a fuel mixing means of an internal combustion engine according to a fourth embodiment of the present invention.

FIG. 10 is a sectional view of a fuel mixing means of an internal combustion engine according to a fourth embodiment of the present invention.

Since this embodiment has a structure similar to that in the previous third embodiment, only the difference between the two embodiments will be described.

Support ribs 434 are formed to extend radially inwardly on an inner surface of a stream-disturbing body 430. In the same manner as the support ribs in the aforementioned first embodiment, each of the support ribs 434 should have a small surface perpendicular to a flowing direction of a mixture of fuel and air, such that the support ribs do not obstruct the flow of the mixture passing through the hollow of the stream-disturbing body. A hub 435 is fixed to ends of the support ribs 434, a through-bore is formed in the hub 435 to be arranged in the same direction as the hollow of the stream-disturbing body, and a support shaft 436 is inserted into and supported by the through-bore. An auxiliary stream-disturbing body 437 having a plurality of vanes formed on an outer surface thereof is fitted around the support shaft 436. In this case, in order to form a vortex or turbulence, it is preferred that the auxiliary stream-disturbing body 437 be caused to rotate in a reverse direction with respect to the stream-disturbing body. It is sufficient so far as the auxiliary stream-disturbing body 437 can rotate relatively with respect to the hub 435. Therefore, the support shaft 436 may be rotatably supported by the hub 435, or the auxiliary stream-disturbing body 437 may be supported to rotate with respect to the support shaft 436. Nevertheless, the former case is desirable for convenience of assembly. Preferably, the outer diameter of the auxiliary stream-disturbing body 437 including the vanes is less than the inner diameter of the stream-disturbing body 430 including vanes. In this case, since the auxiliary stream-disturbing body 437 can be disposed partially and fully within an inner space defined by the stream-disturbing body 430 in the same manner as the aforementioned second embodiment, it is possible to generate a stronger vortex or turbulence of the mixture. Further, each of the vanes of the auxiliary stream-disturbing body 437 and the stream-disturbing body 430 have a spiral shape. More preferably, the vanes of the auxiliary stream-disturbing body and the stream-disturbing body are formed to have helixes in opposite directions so that the auxiliary stream-disturbing body and the stream-disturbing body can rotate in opposite directions.

Figure 11:
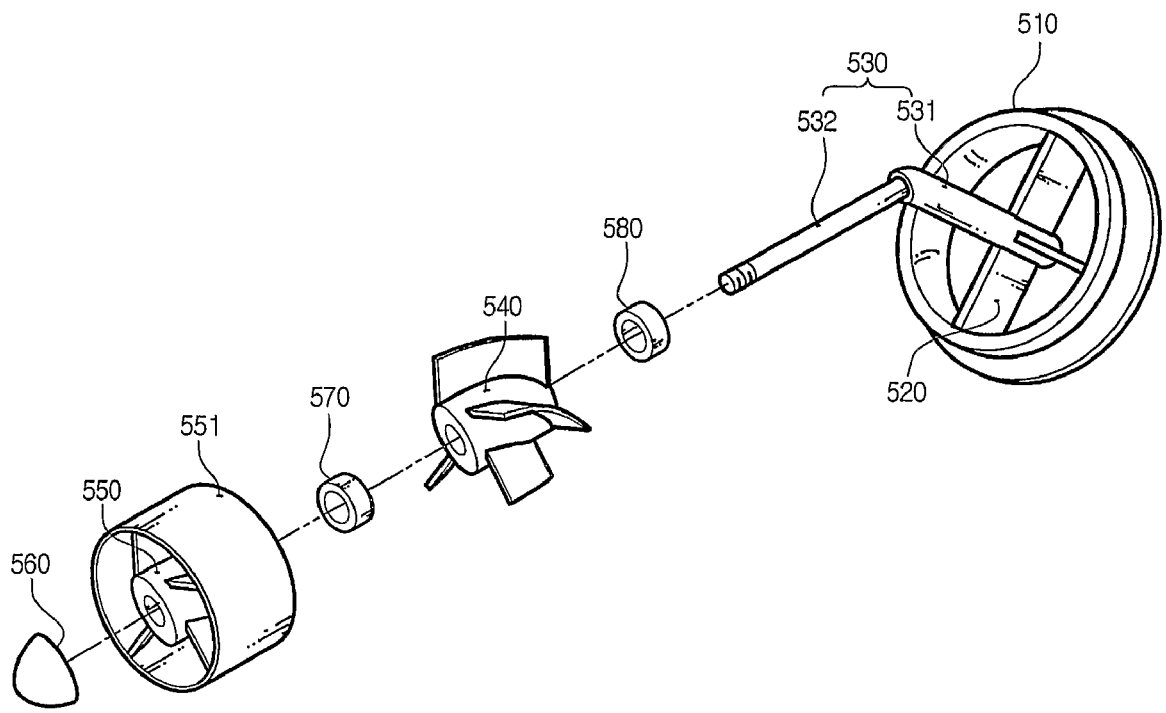
FIG. 11 is an exploded perspective view of a fuel mixing means of an internal combustion engine according to a fifth embodiment of the present invention.
Figure 12:
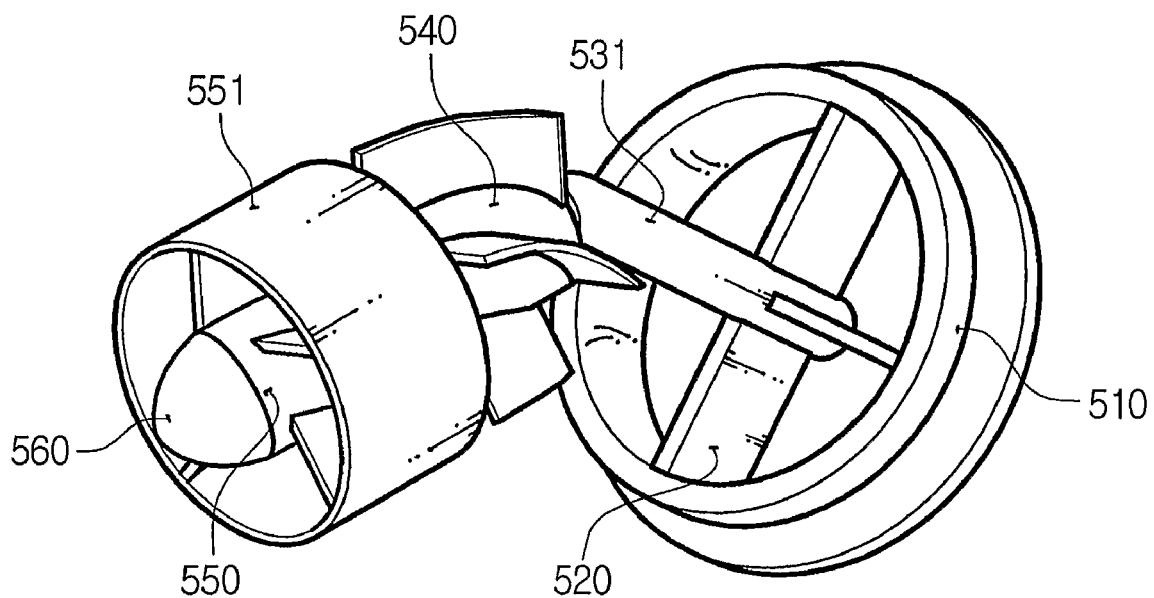
FIG. 12 is a perspective view showing an assembled state of the fuel mixing means shown in FIG. 11.
Figure 13:
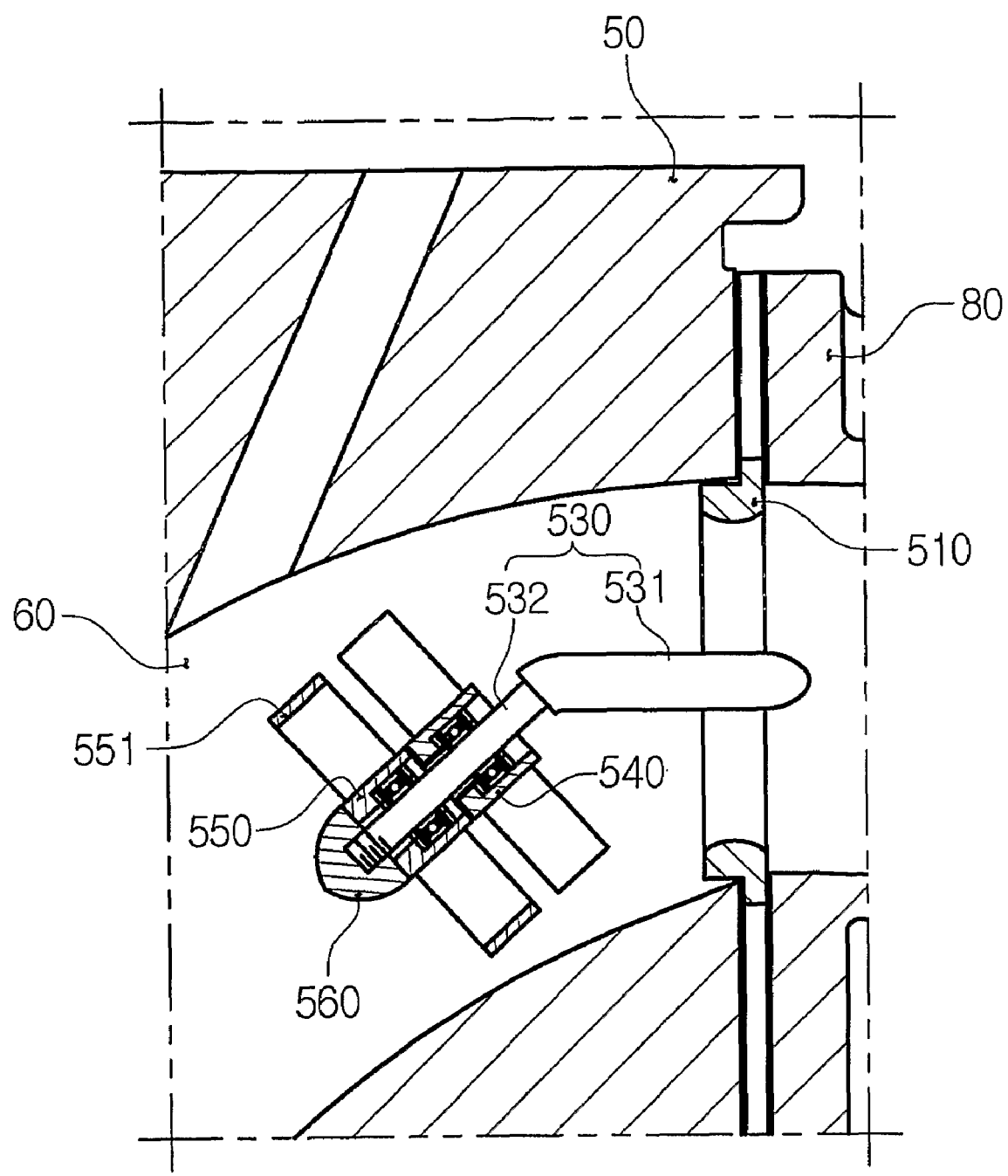
FIG. 13 is a sectional view showing a state where the fuel mixing means of FIG. 11 is installed at an intake port.

FIG. 11 is an exploded perspective view of a fuel mixing means of an internal combustion engine according to a fifth embodiment of the present invention, FIG. 12 is a perspective view showing an assembled state of the fuel mixing means shown in FIG. 11, and FIG. 13 is a sectional view showing a state where the fuel mixing means of FIG. 11 is installed at an intake port.

The internal combustion engine of this embodiment comprises a support ring 510 fixedly inserted into an inlet of an intake port that is formed in a cylinder head and functions as a passage through which a mixture of fuel and air is supplied to a combustion chamber. The support ring 510 typically takes the shape of a hollow cylinder. However, the support ring may have an elliptical shape or polygonal shape according to the shape of the inlet of the intake port into which the support ring is to be fixedly inserted. Further, in order to secure the maximum flow rate of the mixture of fuel and air passing through the hollow of the support ring and to obtain a desired strength, it is preferred that the support ring 510 have an inner surface that takes the shape of a meniscus convexed radially inwardly when viewed in the sectional view of FIG. 13.

A support rib 520 extends radially inwardly from an inner surface of the support ring 510. Preferably, the support rib 520 takes the shape of a wing with a certain width in a direction of a support shaft of the support ring in order to guide a stream of the mixture of fuel and air in a specific direction without hindrance. The support rib may be at a certain angle with respect to a flowing direction of the mixture. To support the support shaft 530 to be described later, a plurality of the support rib 520 may be provided as many as required.

An end of the support shaft 530 is fixed to the support rib 520. The support shaft 530 comprises an extension portion 531 extending in the direction of the support shaft of the support ring 510, and a bent portion 532 bent at and extending from the extension portion. The length of the extension portion 531 is determined depending on the curved shape of the intake port. However, it is preferred that the extension portion have such a length that at least a part of the extension portion can protrude beyond the support ring 510. Further, it is preferred that the diameter of the bent portion 532 be less than that of the extension portion 531. Since the support shaft 530 is bent, it is possible to place a stream-disturbing body, which is disposed at an end of the support shaft, at a deep location inside the intake port regardless of the bent shape of the intake port.

An end of the bent portion 532 of the support shaft 530 is inserted into the stream-disturbing body 540. To this end, the stream-disturbing body 540 takes the shape of a hollow cylinder and has a plurality of vanes formed on an outer surface thereof, and the support shaft 530 is inserted into the hollow of the stream-disturbing body 540. To promote the generation of a vortex or turbulence, it is preferred that an auxiliary stream-disturbing body 550 be further provided in addition to the stream-disturbing body 540. The shape of the auxiliary stream-disturbing body 550 may be identical to that of the stream-disturbing body 540. At this time, the bent portion 532 of the support shaft 530 is inserted sequentially into the hollows of the stream-disturbing body 540 and the auxiliary stream-disturbing body 550, so that the stream-disturbing body 540 and the auxiliary stream-disturbing body 550 are arranged in series. Each of the vanes formed on outer surfaces of the stream-disturbing body 540 and the auxiliary stream-disturbing body 550 has a spiral shape. When the stream-disturbing body and the auxiliary stream-disturbing body are rotatably supported by the support shaft, the two stream-disturbing bodies 540 and 550 rotate in response to the flow of the mixture, thereby developing the flow of the mixture into a vortex or turbulence. In this case, helixes of the vanes of the stream-disturbing bodies 540 and 550 are formed in opposite directions so that the two stream-disturbing bodies 540 and 550 can rotate in opposite directions with respect to each other. Furthermore, one or both of the stream-disturbing bodies 540 and 550 may be fixed to the support shaft. The fixed stream-disturbing body or bodies guide the flow of the mixture without rotating in response to the flow of the mixture.

Meanwhile, the vanes formed on each of the two stream-disturbing bodies 540 and 550 may be manufactured to optionally have an outer rim 551. It is preferred that the outer rim 551 be a thin-walled hollow cylinder of which an inner surface is in contact with radially outward ends of the vanes and the central axis of the outer rim 551 is substantially coincident with the support shaft of the stream-disturbing body. The stream-disturbing body 550 with the outer rim 551 can confine a part of the mixture that deviates radially from the center of rotation of the stream-disturbing body along the surfaces of the vanes, i.e., a part of the mixture that deviates from the flowing direction of the entire mixture. Although FIGS. 11 to 13 show that only the auxiliary stream-disturbing body 550 is provided with the outer rim 551, the stream-disturbing body 540 may also be provided with an identical outer rim. Reference numerals 570 and 580 that have not yet been described designate bearings interposed to enable the stream-disturbing body 540 and the auxiliary stream-disturbing body 550 to rotate smoothly with respect to the support shaft 530, and reference numeral 560 designates a streamlined cap coupled to an end of the support shaft 530 after the support shaft 530 is inserted into the two stream-disturbing bodies 540 and 550 so as to prevent the two stream-disturbing bodies 540 and 550 from coming out and to reduce resistance to the flow of the mixture.

In the used state of this embodiment described above, as shown in FIG. 13, the support ring 510 is fixedly inserted into the inlet of the intake port 60 formed in the cylinder head 50. A stream of the mixture of air and fuel, which has passed through the intake manifold 80, is developed into a stronger vortex or turbulence while passing through the stream-disturbing body 540 or the auxiliary stream-disturbing body so that the fuel and the air in the mixture are uniformly mixed and then supplied into the combustion chamber.

Figure 14:
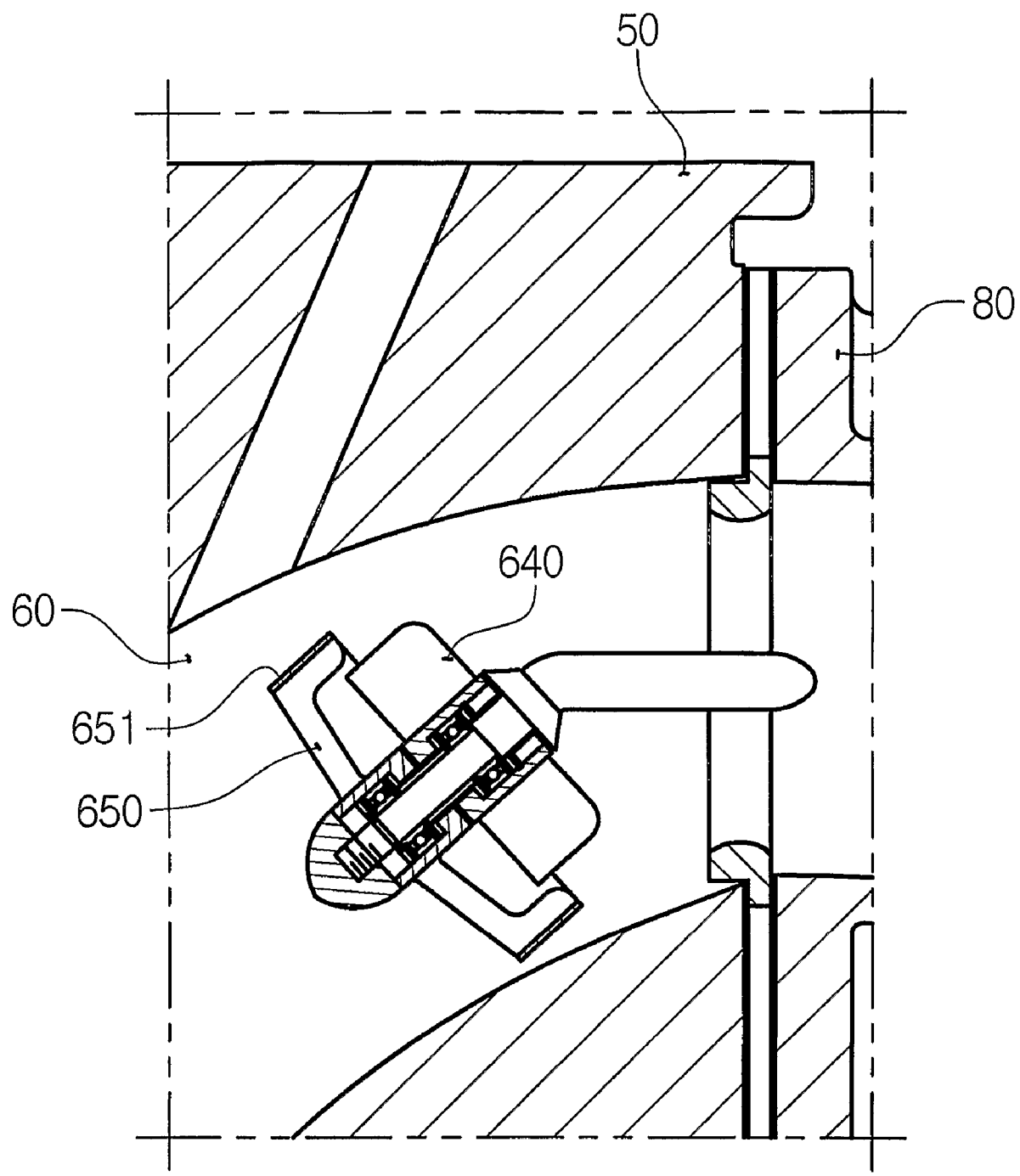
FIG. 14 is a sectional view showing a state where a fuel mixing means of an internal combustion engine according to a sixth embodiment of the present invention is installed at an intake port.

FIG. 14 is a sectional view showing a state where a fuel mixing means of an internal combustion engine according to a sixth embodiment of the present invention is installed at an intake port.

This embodiment is different from the previous embodiment in view of the shape of vanes of an auxiliary stream-disturbing body 650. The vanes of the auxiliary stream-disturbing body 650 extend radially from an outer surface of a hollow cylinder and in the radial direction and then further extend in a longitudinal direction of a rotational support shaft. In this case, the vanes of the auxiliary stream-disturbing body 650 can rotate outside of vanes of a stream-disturbing body 640. That is, since the vanes of the stream-disturbing body 640 and the vanes of the auxiliary stream-disturbing body 650 can be placed on the same sectional plane perpendicular to the rotational support shaft, the stream of the mixture that has passed through the sectional plane can be developed into a stronger vortex or turbulence. The auxiliary stream-disturbing body 650 of this embodiment may also be provided with an outer rim 651 similar to the outer rim of the previous embodiment.

According to the present invention described above, a fuel mixing means is provided to disturb a stream at an intake port of a cylinder head and to generate a vortex or turbulence, thereby uniformly mixing fuel and air with each other. Further, a vortex or turbulence is generated at a location close to a combustion chamber to cause a mixture of fuel and air to be introduced into the combustion chamber in a vortex or turbulence state, thereby preventing the occurrence of incomplete combustion and a knocking to improve the performance of the engine.

The invention claimed is:

1. An internal combustion engine including a cylinder head with an intake port for use in supplying air or a mixture of fuel and air into a combustion chamber, comprising:
    a fuel mixing means inserted into the intake port, the fuel mixing means having a stream-disturbing body with a plurality of vanes formed thereon for disturbing a stream passing through the intake port, wherein the fuel mixing means further comprises:
    a hollow cylindrical support ring fixedly inserted into the intake port;
    a support rib extending radially inwardly from an inner surface of the support ring;
    a hub having a through-bore and an outer surface fixed to the support rib such that the through-bore is arranged in the same direction as the hollow of the support ring; and
    a support shaft inserted and supported in the through-bore of the hub, and wherein the stream-disturbing body is supported by the support shaft, and the plurality of vanes are formed on an outer surface of the stream-disturbing body.

2. The internal combustion engine according to claim 1, wherein the support ring includes a guide vane extending radially inwardly from the inner surface thereof.

3. The internal combustion engine according to claim 1, wherein the support shaft is inserted and supported rotatably in the through-bore of the hub.

4. The internal combustion engine according to claim 1, further comprising: a hollow cylindrical support ring extension member inserted into the intake port such that a flange formed on one end of the support ring extension member is engaged with an inlet of the intake port, the support ring extension member having the other end coupled to an end of the support ring that is opposite to another end of the support ring adjacent to the combustion chamber.

5. The internal combustion engine according to claim 1, wherein the stream-disturbing body is rotatably supported on the support shaft.

6. The internal combustion engine according to claim 5, wherein the support shaft comprises an extension portion having one end fixed to the support rib, and a bent portion bent at and extending from the other end of the extension portion, the bent portion having a diameter less than that of the extension portion, and the stream-disturbing body is rotatably supported by the bent portion.

7. The internal combustion engine according to claim 1, further comprising: an auxiliary stream-disturbing body rotatably supported on the support shaft and having a plurality of vanes formed thereon.

8. The internal combustion engine according to claim 7, wherein the auxiliary stream-disturbing body takes the shape of a hollow cylinder and has the vanes formed on an inner surface thereof, and an inner diameter of the auxiliary stream-disturbing body including the vanes is larger than an outer diameter of the stream-disturbing body including vanes.

9. The internal combustion engine according to claim 7, wherein each of the vanes of the stream-disturbing body and the auxiliary stream-disturbing body has a spiral shape, and helixes of the vanes of the auxiliary stream-disturbing body and the stream-disturbing body are formed in opposite directions.

10. The internal combustion engine according to claim 7, further comprising: a cylindrical rim formed to surround radially outward ends of the plurality of vanes of at least one of the stream-disturbing body and the auxiliary stream-disturbing body.

11. The internal combustion engine according to claim 1, wherein the fuel mixing means further comprises a bearing installed at an inlet of the intake port, the stream-disturbing body takes the shape of a hollow cylinder and has a plurality of vanes formed on an inner surface thereof, the stream-disturbing body having one end supported rotatably by the bearing and the other end inserted into the intake port.

12. The internal combustion engine according to claim 1, wherein the fuel mixing means further comprises: a hollow cylindrical support ring inserted into the intake port such that a flange formed on one end of the support ring is caught at an inlet of the intake port; and a bearing fixed to an inner surface of the support ring, and wherein the stream-disturbing body takes the shape of a hollow cylinder and has a plurality of vanes formed on an inner surface thereof, the stream-disturbing body being supported rotatably by the bearing.

13. The internal combustion engine according to claim 11, further comprising: a support rib extending radially inwardly from an inner surface of the stream-disturbing body; a hub having a through-bore and an outer surface fixed to the support rib such that the through-bore is arranged in the same direction as the hollow of the stream-disturbing body; a support shaft fixedly inserted into the through-bore of the hub; and an auxiliary stream-disturbing body supported by the support shaft and having a plurality of vanes formed on an outer surface thereof.

14. The internal combustion engine according to claim 13, wherein the support shaft is inserted and supported rotatably in the through-bore of the hub.

15. The internal combustion engine according to claim 13, wherein the auxiliary stream-disturbing body is supported rotatably on the support shaft.

16. The internal combustion engine according to claim 13, wherein an outer diameter of the auxiliary stream-disturbing body including the vanes is less than an inner diameter of the stream-disturbing body including the vanes.

* * * * *